(12) United States Patent
Buelow et al.

(10) Patent No.: US 9,457,340 B2
(45) Date of Patent: Oct. 4, 2016

(54) METHODS OF APPLYING A SORBENT COATING ON A SUBSTRATE, A SUPPORT, AND/OR A SUBSTRATE COATED WITH A SUPPORT

(71) Applicant: BASF Corporation, Florham Park, NJ (US)

(72) Inventors: Mark Buelow, Flemington, NJ (US); Michael Durilla, Howell, NJ (US); John Kauffman, Hazlet, NJ (US); Pascaline Harrison Tran, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 579 days.

(21) Appl. No.: 13/644,454

(22) Filed: Oct. 4, 2012

(65) Prior Publication Data
US 2013/0095996 A1   Apr. 18, 2013

Related U.S. Application Data

(60) Provisional application No. 61/543,999, filed on Oct. 6, 2011.

(51) Int. Cl.
B01J 20/32 (2006.01)
B01D 53/02 (2006.01)

(52) U.S. Cl.
CPC .......... *B01J 20/3238* (2013.01); *B01D 53/02* (2013.01); *B01J 20/3204* (2013.01); *B01J 20/327* (2013.01); *B01J 20/3236* (2013.01); *B01J 20/3251* (2013.01); *B01J 20/3257* (2013.01); *B01J 20/3272* (2013.01); *B01D 2253/20* (2013.01); *B01D 2253/202* (2013.01); *B01D 2253/25* (2013.01); *B01D 2253/306* (2013.01); *B01D 2253/311* (2013.01); *B01D 2253/34* (2013.01); *B01D 2257/504* (2013.01); *Y02C 10/08* (2013.01)

(58) Field of Classification Search
None
See application file for complete search history.

(56) References Cited

U.S. PATENT DOCUMENTS

| 6,547,854 | B1 | 4/2003 | Gray et al. |
| 7,022,158 | B2 | 4/2006 | Seguin et al. |
| 2001/0055554 | A1 | 12/2001 | Hoke et al. |
| 2004/0231307 | A1 | 11/2004 | Wood et al. |
| 2006/0165574 | A1 | 7/2006 | Sayari |
| 2007/0107599 | A1 | 5/2007 | Hoke et al. |
| 2010/0154636 | A1 | 6/2010 | Liu et al. |
| 2012/0216676 | A1* | 8/2012 | Addiego ............... B01D 53/02 95/139 |

FOREIGN PATENT DOCUMENTS

| WO | 2009061470 | 5/2009 |
| WO | 2012118587 | 9/2012 |

OTHER PUBLICATIONS

International Preliminary Report on Patentability Apr. 8, 2014.
(Continued)

*Primary Examiner* — Colin W Slifka
(74) *Attorney, Agent, or Firm* — Lowenstein Sandler LLP (57) ABSTRACT

Methods of applying a sorbent coating on a substrate, a support, and/or a substrate coated with a support are described. One of the methods comprises: (i) optionally, preparing the substrate coated with the support by pre-treating the substrate with a slurry, wherein the slurry comprises: a. solvent, b. a binder, c. the support, and d. optional dispersant; and (ii) treating the substrate, the support, and/or the substrate coated with the support, with a sorbent.

34 Claims, 10 Drawing Sheets

(56) References Cited

OTHER PUBLICATIONS

European Search Report for European Patent No. Ep 12 83 8921 dated Jul. 8, 2015, 11 pgs.

Plaza, et al., Application of thermogravimetric analysis to the evaluation of animated solid sorbents for CO capture, Journal of Thermal Analysis and Calorimetry, Jun. 22, 2008, 20 pgs., vol. 92, No. 2, Kluwer Academic Publishers, Dordrecht, NL.

RUPTO, Office Action and English translation for Russian Patent App. No. 2014 117 818, dated May 30, 2016, 11 pages.

* cited by examiner

| Description | Organic Fraction | CO2 Adsorption | Surface Area (m²/g) | | | | | Hg Porosimetry | | |
|---|---|---|---|---|---|---|---|---|---|---|
| | | | Surface Area (m2/g) | N2 Single Point Pore Volume Radius <1,335 A (cc/g) | BJH Pore Volume 10-300A | BJH Primary Pore Radius (A) | BET Average Pore Radius (A) | Total Intrusion Volume cc/g | Median Pore Radius (area) A | Bulk Density g/cc |
| Alumina A | 30 | 1.4 | 190.9 | 0.617 | 0.600 | 48.6 | 64.62 | 1.282 | 47 | 0.558 |
| Alumina B | 28 | 1.89 | 175.3 | 1.245 | 1.077 | 102.1 | 142.03 | 4.317 | 74 | 0.204 |
| Alumina C | 24 | 0.92 | 128.0 | 0.429 | 0.422 | 47.0 | 66.99 | 0.870 | 51 | 0.841 |
| Alumina D | 29 | 1.15 | 82.2 | 0.418 | 0.413 | 71.8 | 101.74 | 0.911 | 77 | 0.768 |
| Alumina E | 26 | 1.51 | 174.1 | 0.826 | 0.819 | 88.8 | 94.95 | 1.464 | 68 | 0.514 |
| Alumina F | 36 | 1.1 | 129.0 | 0.993 | 0.984 | 112.4 | 153.97 | 1.724 | 99 | 0.454 |
| Alumina G | 39 | 1.16 | 133.5 | 1.033 | 1.026 | 111.1 | 154.69 | 1.697 | 93 | 0.483 |
| Alumina H | 27 | 1.47 | 91.2 | 0.981 | 0.799 | 126.5 | 215.08 | 1.677 | 142 | 0.471 |
| Alumina I | 32 | 1.63 | 139.5 | 1.091 | 0.944 | 106.5 | 156.42 | 2.100 | 105 | 0.380 |
| Alumina J | 26 | 0.84 | 376.4 | 0.314 | 0.211 | 19.8 | 16.69 | 0.764 | 46 | 0.757 |
| Alumina K | 26 | 1.28 | 145.7 | 1.178 | 1.087 | 116.1 | 323.32 | 3.079 | 117 | 0.289 |

FIG. 4A

| Testing Materials | | Material Loadings | | | | Adsorption | | | |
|---|---|---|---|---|---|---|---|---|---|
| Support Material | Adsorbant Material | Adsorbant Material Loading | Organic Loading | Total Material Amount | Total Material Loading | Adsorbed Amount | $CO_2$ Adsorbed | Adsorbed $CO_2$ per g Total Loading (Support & Adsorbent) | Adsorbed $CO_2$ per g Total Loading (Support & Adsorbent) | Adsorbed $CO_2$ per g Adsorbant Loading (Adsorbent Only) |
| | | g/in² | % | g | g/in² | mg | mmol | mg/g | mmol/g | mmol/g |
| alumina C | polyethylenimine | 0.95 | 0.40 | 3.69 | 2.35 | 203.68 | 4.63 | 55.18 | 1.25 | 3.11 |
| alumina C | polyethylenimine | 1.40 | 0.49 | 4.52 | 2.88 | 126.62 | 2.88 | 28.01 | 0.64 | 1.31 |
| alumina B | polyethylenimine | 0.64 | 0.28 | 10.76 | 2.28 | 894.43 | 20.33 | 83.11 | 1.89 | 6.69 |
| alumina B | polyethylenimine | 1.72 | 0.51 | 15.84 | 3.36 | 957.42 | 21.76 | 60.44 | 1.37 | 2.68 |
| alumina B | polyethylenimine | 1.07 | 0.39 | 12.77 | 2.71 | 1079.86 | 24.54 | 84.60 | 1.92 | 4.87 |
| alumina B | polyethylenimine | 0.31 | 0.16 | 9.19 | 1.95 | 459.03 | 10.43 | 49.94 | 1.13 | 7.11 |
| alumina B | polyethylenimine | 2.05 | 0.56 | 17.40 | 3.69 | 783.80 | 17.81 | 45.04 | 1.02 | 1.84 |
| alumina B | polyethylenimine | 1.63 | 0.50 | 15.39 | 3.27 | 1054.00 | 23.95 | 68.50 | 1.56 | 3.13 |
| alumina K | polyethylenimine | 0.44 | 0.26 | 8.00 | 1.70 | 450.76 | 10.24 | 56.35 | 1.28 | 4.89 |
| alumina K | polyethylenimine | 0.87 | 0.37 | 10.96 | 2.33 | 653.44 | 14.85 | 59.62 | 1.36 | 3.64 |
| alumina K | polyethylenimine | 1.60 | 0.52 | 14.34 | 3.04 | 367.76 | 8.36 | 25.65 | 0.58 | 1.11 |

FIG. 4B

| Testing Materials | | Material Loadings | | | | Desorption | | | | |
|---|---|---|---|---|---|---|---|---|---|---|
| Support Material | Adsorbant Material | Adsorbant Material Loading | Organic Loading | Total Material Amount | Total Material Loading | Desorbed Amount | CO2 Desorbed | Desorbed CO2 per g Total Loading (Support & Adsorbent) | Desorbed CO2 per g Total Loading (Support & Adsorbent) | Desorbed CO2 per g Adsorbant Loading (Adsorbent Only) |
| | | g/ft² | % | g | g/ft² | mg | mmol | mg / g | mmol / g | mmol / g |
| alumina C | polyethylenimine | 0.95 | 0.40 | 3.69 | 2.35 | | 0.00 | 0.00 | 0.00 | 0.00 |
| alumina C | polyethylenimine | 1.40 | 0.49 | 4.52 | 2.88 | | 0.00 | 0.00 | 0.00 | 0.00 |
| alumina B | polyethylenimine | 0.64 | 0.28 | 10.76 | 2.28 | 777.01 | 17.66 | 72.20 | 1.64 | 5.81 |
| alumina B | polyethylenimine | 1.72 | 0.51 | 15.84 | 3.36 | 770.17 | 17.50 | 48.62 | 1.10 | 2.16 |
| alumina B | polyethylenimine | 1.07 | 0.39 | 12.77 | 2.71 | 963.05 | 21.89 | 75.44 | 1.71 | 4.34 |
| alumina B | polyethylenimine | 0.31 | 0.16 | 9.19 | 1.95 | 480.88 | 10.93 | 52.31 | 1.19 | 7.45 |
| alumina B | polyethylenimine | 2.05 | 0.56 | 17.40 | 3.69 | 719.37 | 16.35 | 41.34 | 0.94 | 1.69 |
| alumina B | polyethylenimine | 1.63 | 0.50 | 15.39 | 3.27 | 1048.83 | 23.84 | 68.16 | 1.55 | 3.11 |
| alumina K | polyethylenimine | 0.44 | 0.26 | 8.00 | 1.70 | 462.24 | 10.51 | 57.78 | 1.31 | 5.02 |
| alumina K | polyethylenimine | 0.87 | 0.37 | 10.96 | 2.33 | 651.66 | 14.81 | 59.46 | 1.35 | 3.63 |
| alumina K | polyethylenimine | 1.60 | 0.52 | 14.34 | 3.04 | 486.91 | 11.07 | 33.95 | 0.77 | 1.47 |

METHODS OF APPLYING A SORBENT COATING ON A SUBSTRATE, A SUPPORT, AND/OR A SUBSTRATE COATED WITH A SUPPORT

This application claims priority to U.S. Provisional Patent Application No. 61/543,999, filed on Oct. 6, 2011, which is hereby incorporated herein by reference in its entirety.

TECHNICAL FIELD

Methods of applying a sorbent coating on a substrate, a support, and/or a substrate coated with a support are described in this application. The sorbents in the methods described herein can adsorb gases such as carbon dioxide. The carbon dioxide can be adsorbed from the air or from carbon dioxide point sources like off-gases or intentionally produced carbon dioxide, or from their mixtures. The sorbents described herein can be used for gas purification or for gas separation.

BACKGROUND

U.S. Pat. No. 7,378,561 discusses a method for producing methanol and dimethyl ether using the air as the sole source of materials is disclosed. The method relates to separating water (i.e., the moisture in the air) and carbon dioxide content of atmospheric air for their use in the subsequent production of methanol, dimethyl ether and derived synthetic hydrocarbons as products. The method includes the conversion of carbon dioxide and water under conditions sufficient to produce methanol and/or dimethyl ether. Carbon dioxide is captured on a suitable absorbent, preferentially polyethyleneimine supported on nano-structured fumed silica.

WO2008/021700 discusses regenerative, supported amine sorbents that include an amine or an amine/polyol composition deposited on a nano-structured support such as nanosilica.

JP 61-227821 discusses a method for removing carbon dioxide gas by adsorption via a solid amine adsorbent.

Chen et al., Gel-coated polymeric solid amine for sorption of carbon dioxide from humid air, Journal of Polymer Materials (2002), 19(4), 381-387, discusses adsorption of carbon dioxide using polyethyleneimine.

WO2009/149292 discusses a method for capturing carbon dioxide from an air stream, comprising exposing one or more collection surfaces formed of a solid sorbent material, wherein the solid sorbent material absorbs carbon dioxide from the air stream.

U.S. Patent Application Publication 2008/0289495 provides a system for removing carbon dioxide from an atmosphere to reduce global warming which can increase availability of renewable energy or non-fuel products such as fertilizers and construction materials, comprising: an air extraction system that collects carbon dioxide from the atmosphere through a medium and removes carbon dioxide from the medium; a collection system that isolates the removed carbon dioxide to a location for at least one of sequestration, storage and generation of a renewable carbon fuel or non-fuel products such as fertilizers and construction materials; and one or more energy sources that supply process heat to the air extraction system to remove the carbon dioxide from the medium and which can regenerate it for continued use.

U.S. Patent Application Publication 2007/0149398 provides a carbon dioxide sorption structure, comprising: a high surface area structure that includes a plurality of pores in the high surface area structure, wherein each pore has an inside surface, wherein at least the inside surface of the pore includes hydroxyl groups on the surface; and a hyperbranched polymer covalently bonded to the inside surface of the pore via the oxygen of the hydroxyl group on the inside surface of the pore.

There continues to be an increased need throughout the world to limit release of carbon dioxide.

As evidenced by some of the references discussed hereinabove, it has been difficult to develop high-performing and cost-effective carbon dioxide capture/separation technologies.

Therefore, there still remains a need in the industry to develop technologies that provide high-performing and cost-effective adsorption of carbon dioxide and/or other gases.

SUMMARY

According to one embodiment, a method of applying a sorbent coating on a substrate, a support, and/or a substrate coated with a support is disclosed. The method comprises: (i) optionally, preparing the substrate coated with the support by pre-treating the substrate with a slurry, wherein the slurry comprises: a. solvent, b. a binder, c. the support, and d. optional dispersant; and (ii) treating the substrate, the support, and/or the substrate coated with the support, with a sorbent; wherein the substrate is (a) a monolithic or honeycomb structure made of ceramic, metal, or plastic; (b) a polyurethane foam, a polypropylene foam, a polyester foam, a metal foam, or a ceramic foam; or (c) woven or non-woven plastic or cellulosic fibers, wherein the support is alumina, silica, silica-alumina, titania, zirconia, carbon, zeolite, metal-organic framework (MOF), or combinations thereof, and wherein the sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof.

According to another embodiment, a method of applying a sorbent coating on a substrate, a support, and/or a substrate coated with a support is disclosed. The method comprises: (i) treating the substrate, the support, and/or the substrate coated with the support, with a slurry comprising: a. a solvent, b. a binder, and c. the sorbent; wherein the substrate is (a) a monolithic or honeycomb structure made of ceramic, metal, or plastic; (b) a polyurethane foam, a polypropylene foam, a polyester foam, a metal foam, or a ceramic foam; or (c) woven or non-woven plastic or cellulosic fibers, wherein the support is alumina, silica, silica-alumina, titania, zirconia, carbon, zeolite, metal-organic framework (MOF), or combinations thereof, and wherein the sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof.

In other embodiments, the sorbent coated substrate, the sorbent coated support, and the sorbent coated substrate coated with the support of the above-discussed methods are described.

In yet other embodiments, the sorbent coatings of the above-discussed methods are described.

In the embodiments described in this disclosure, the sorbents in the methods described herein can adsorb gases such as carbon dioxide.

According to an embodiment, an alumina support comprising a sorbent coating is disclosed, wherein the sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof, and wherein the alumina support has a surface area of about 150 $m^2/g$ to 250 $m^2/g$ and a pore volume of about 0.7 cc/g to 1.5 cc/g.

DETAILED DESCRIPTION

The terms "about" or "approximately" when used herein and associated with a numeric value refer to that numeric value plus or minus 10%, preferably plus or minus 5%, more preferably plus or minus 2%, most preferably plus or minus 1%.

Double-Dip Method

According to one embodiment, a method of applying a sorbent coating on a substrate, a support, and/or a substrate coated with a support is disclosed. The method comprises:

(i) optionally, preparing the substrate coated with the support by pre-treating the substrate with a slurry, wherein the slurry comprises: a. solvent, b. a binder, c. the support, and d. optional dispersant; and (ii) treating the substrate, the support, and/or the substrate coated with the support, with a sorbent.

The dispersants can be anionic, cationic, or non-ionic selected from the group consisting of polyacrylates, alkoxylates, carboxylates, phosphate esters, polyether polymers, sulfonates, sulfosuccinates, stearates, laureates, amines, amides, imidazolines, sodium dodecylbenzene sulfonate, sodium dioctyl sulfosuccinate, polyoxypropylene-polyoxyethylene polymer, alkyl phenyl ethoxylates, and mixtures thereof. Preferred dispersants include polyacrylic acid polymers and polyethers.

The substrate is (a) a monolithic or honeycomb structure made of ceramic, metal, or plastic; (b) a polyurethane foam, a polypropylene foam, a polyester foam, a metal foam, or a ceramic foam; or (c) woven or non-woven plastic or cellulosic fibers that are either natural or manufactured.

The support is alumina, silica, silica-alumina, titania, zirconia, carbon, zeolite, metal-organic framework (MOF), or combinations thereof.

The support may contain promoters such as lanthanum, ceria, or barium to stabilize the support and/or enhance the effectiveness of the sorbent.

The sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof.

The "sorbent" as referred to herein includes one sorbent or a mixture of sorbents alone or coated on the substrate, the support, and/or the substrate coated with the support.

The sorbent coating on the substrate, the support, and/or the substrate coated with the support can be used to adsorb carbon dioxide from the air or from carbon dioxide point sources like off-gases or intentionally produced carbon dioxide, or from their mixtures. The carbon dioxide obtained in this manner can be used for further storing and/or in several applications such as enhanced oil recovery, carbonation of beverages, for food processing/cooling/freezing, as reactant in the production of chemicals, as feedstock for algae, or as a fire extinguishing medium.

The sorbent coating on the substrate, the support, and/or the substrate coated with the support can also be used for gas purification or for gas separation. For example, the sorbent can be used in natural gas purification and/or breathing air purification, such as submarine air purification, air treatment in air conditioning devices, or hospital air purification. The sorbent can adsorb carbon dioxide to purify natural gas, ambient air, flue gas, or other impure gas mixtures containing carbon dioxide.

Burning of methane produces carbon dioxide which is an example of intentionally produced carbon dioxide.

Figure 1:
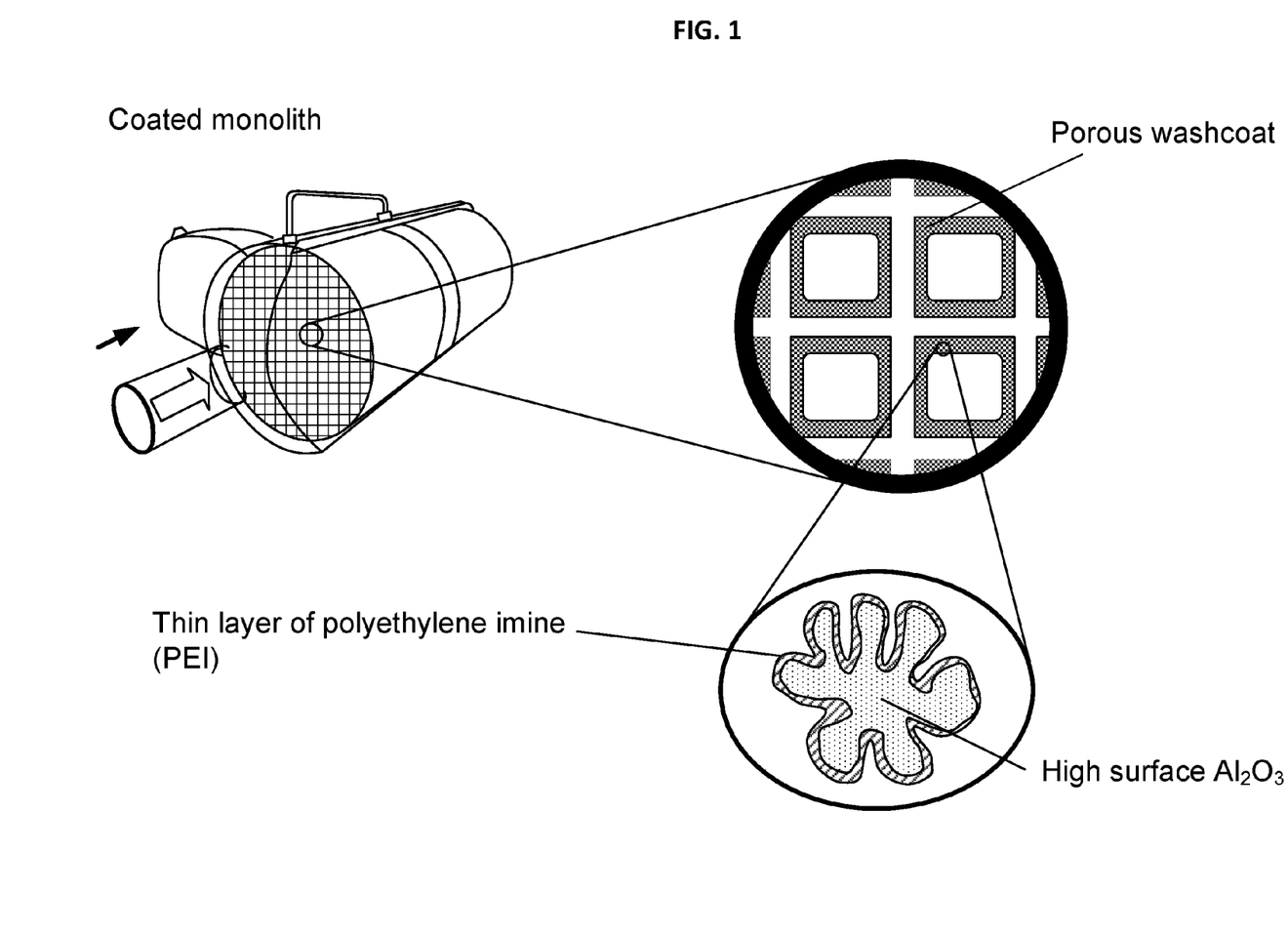
FIG. 1 shows a picture of a coated monolith and the honeycomb structure within the coated monolith includes a schematically shown porous washcoat which includes high surface $Al_2O_3$ (alumina) and a thin layer of polyethylenimine (PEI).

According to an embodiment, FIG. 1 shows a picture of a coated monolith and the honeycomb structure within the coated monolith includes a schematically shown porous washcoat which includes high surface $Al_2O_3$ (alumina) and a thin layer of PEI.

Step (i) of the above double-dip method can further comprise:
a. coating the substrate with the slurry;
b. removing excess solvent from the coated substrate; and
c. calcining the binder and the support onto the substrate.

The calcining can occur at a temperature range of 200° C. to 550° C., preferably a temperature of 425° to 475° C., and more preferable at a temperature of 450° C.

The binder in step (i) of the double-dip method can be alumina sol, aluminum oxide hydroxide, silica sol, titania sol, zirconium acetate, silicone, or combinations thereof.

The slurry containing support and/or binder can be milled to have a D50 particle size ranging from 1 μm to 10 μm and more preferably a D50 particle size ranging from 3 μm to 6 μm.

The double-dip method can further comprise:

(iii) after step (ii), drying the treated substrate to remove excess amounts of the sorbent and to remove excess solvent to obtain a sorbent coated substrate, a sorbent coated support, and/or a sorbent coated substrate coated with a support.

The drying in step (iii) can occur in air at a temperature range of 30° C. to 70° C., more preferably at a temperature range of 40° C. to 60° C., and most preferably at a temperature 50° C. Alternatively the drying can occur in an oxygen-free environment at a temperature up to 110° C.

As provided hereinabove, the slurry comprises: a. solvent, b. a binder, and c. the support, and d. optional dispersant. The binder is typically added in an amount of about 0 to 10 wt % based on the total weight of the support, more preferably in an amount of about 3 to 7 wt % based on the total weight of the support, and even more preferably in an amount of about 6.5 wt % based on the total weight of the support.

In some embodiments, the total solids (support+binder) amount is typically about 15 to 50 wt % based on the total slurry weight. In some embodiments, a surfactant or mixtures of surfactants can be added to help disperse the support (e.g., alumina) in the slurry. The surfactant or mixtures of surfactants can be added in an amount of up to about 10 wt % based on the total weight of the support.

In some embodiments, the sorbent (e.g., PEI) is typically added in an amount of about 25 to 100 wt % based on the total weight of the support and more preferably in an amount of about 40 to 70 wt % based on the total weight of the support.

The amount of PEI that results in the coating as a percentage of the total coating weight (PEI+alumina) is about 20% to 50% with a more preferred range of 30 to 40%. The coating is the total amount of non-solvent material applied to the substrate that remains after drying. For the final part, this includes the support and sorbent and/or binder.

A two-coat coating process includes the following steps. Make first slurry by blending ingredients into a solvent. Typical ingredients are listed below. The total wt % solids in the slurry are typically 20 wt % to 50 wt %. The slurry is applied to the substrate by various methods such as dip-coating or spraying. The coated substrate is dried either partially or wholly to remove excess moisture. The part is then calcined to activate binder. In the case of a honeycomb substrate the amount of coating that is on the part is typically 0.5 g/in$^3$ to 2.0 g/in$^3$ and preferably 1.0 to 1.7 g/in$^3$.

TABLE 1

| Alumina | 78-100% |
|---|---|
| aluminum oxide hydroxide (binder) | 0-10% |
| Dispersant | 0-10% |
| Thickener | 0-2% |

The second coating formulation is made by mixing organic sorbent into solvent (for example PEI in water). The formulation may also contain a dispersant to aid in wetting the support surface. The total wt % solids in the slurry are typically 20 wt % to 50 wt %. This formulation is applied to the substrate by various methods such as dip-coating or spraying. The coated substrate is dried either partially or wholly to remove excess moisture. Typically at least 50 wt % of the solvent is removed by drying. Drying is done under conditions so as to not degrade the organic performance as a $CO_2$ sorbent (low temperature and/or low oxygen content).

TABLE 2

| PEI | 40-100% |
|---|---|
| Dispersant | 0-10% |
| Water | 0-50% |

Single-Dip Method

According to another embodiment, a method of applying a sorbent coating on a substrate, a support, and/or a substrate coated with a support is disclosed. The method comprises:

(i) treating the substrate, the support, and/or the substrate coated with the support, with a slurry comprising: a. a solvent, b. a binder, and c. the sorbent; wherein the substrate is (a) a monolithic or honeycomb structure made of ceramic, metal, or plastic; (b) a polyurethane foam, a polypropylene foam, a polyester foam, a metal foam, or a ceramic foam; or (c) woven or non-woven plastic or cellulosic fibers.

As provided hereinabove, the support is alumina, silica, silica-alumina, titania, zirconia, carbon, zeolite, metal-organic framework (MOF), or combinations thereof.

The supports may contain promoters such as lanthanum, ceria, or barium to stabilize the support and/or enhance the effectiveness of the sorbent.

As further provided hereinabove, the sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof.

The single-dip method can further comprise:

(ii) after step (i), drying the slurry treated substrate, support, and/or substrate coated with the support; and then (iii) removing excess sorbent and solvent at a temperature so as to prevent degradation of the binder or the sorbent to obtain a sorbent coated substrate, a sorbent coated support, and/or a sorbent coated substrate coated with a support.

The drying in step (ii) of the single-dip method can occur at a temperature range of from 50° C. to 150° C., more preferably, at a temperature range of from 70° C. to 110° C.

The binder in step (i) can be selected from the group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, polyvinyl alcohol, thermoplastic polyesters, thermosetting polyesters, poly(phenylene oxide), poly(phenylene sulfide), fluorinated polymers such as poly(tetrafluoroethylene)polyvinylidene fluoride, poly(vinylfluoride) and chloro/fluoro copolymers such as ethylene chlorotrifluoro-ethylene copolymer, polyamide, phenolic resins and epoxy resins, polyurethane, silicone polymers, and combinations thereof.

The binder can be added in an amount of about 6 to 25 wt % based on the weight of the support, more preferably in an amount of about 8 to 16 wt % based on the weight of the support, and even more preferably in an amount of about 10 to 14 wt % based on the weight of the support.

A single-coat coating process includes the following steps. Make slurry by blending ingredients into a solvent. Typical ingredients are listed below. The total wt % solids in the slurry are typically 20 wt % to 50 wt %. The slurry is applied to the substrate by various methods such as dip-coating or spraying. The coated substrate is dried either partially or wholly to remove excess moisture and to activate binder. Drying is done under conditions so as to not degrade the organic performance as a $CO_2$ sorbent (low temperature and/or low oxygen content). In the case of a honeycomb substrate the amount of coating that is on the part is typically 1.0 $g/in^3$ to 4.0 $g/in^3$ and preferably 2.0 to 3.4 $g/in^3$.

TABLE 3

| | |
|---|---|
| Alumina | 10-50% |
| organic polymer | 0-20% |
| Dispersant | 0-10% |
| Thickener | 0-2% |
| PEI | 10-50% |

Double-Dip and Single-Dip Methods

The ceramic substrate in the double-dip and/or the single-dip method(s) can be selected from the group consisting of cordierite, alumina, cordierite-α alumina, silicon nitride, zircon mullite, spodumene, alumina-silica magnesia, zircon silicate, sillimanite, magnesium silicates, zircon, petalite, aluminosilicates, and combinations thereof.

More preferably, the ceramic substrate can be cordierite, alumina, or a combination thereof.

The metal substrate in the double-dip and/or the single-dip method(s) can be aluminum, titanium, stainless steel, a Fe—Cr alloy, or a Cr—Al—Fe alloy in the form of a sheet, mesh, foil, flakes, powder, wire, rod, or combinations thereof.

More preferably, the metal substrate can be aluminum, stainless steel, Cr—Al—Fe alloy, or combinations thereof in the form of a sheet, mesh, or foil.

The plastic substrate in the double-dip and/or the single-dip method(s) can be a polymer and/or copolymer of polyolefin(s), polyester(s), polyurethane(s), polycarbonate(s), polyetheretherketone(s), polyphenylene oxide(s), polyether sulfone(s), melamine(s), polyamide(s), polyacrylates, polystyrenes, polyacrylonitriles, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose, or combinations thereof.

More preferably, the plastic substrate can be a polymer and/or copolymer of polyolefin, polyester, polyurethane, melamine, polypropylene, or polyamide.

The monolithic structure (substrate) can be made of cellulosic fibers (i.e., paper).

The substrate can be made of a ceramic pellet or a carbon pellet.

The examples herein were made on ceramic honeycombs. However, the choice of the particular substrate can be determined by the unique properties of each and their resultant impact on the commercial design of the system. For example, in applications where reducing the weight of the system is critical, or where the pressure drop through the honeycomb is critical, the metallic and cellulosic fiber honeycombs can offer advantages compared to ceramic honeycombs. In applications where heat transfer is critical, the metallic honeycombs can offer advantages compared to the ceramic. In applications where multiple sorbents may be required, the ceramic honeycombs can offer advantages over the other honeycombs.

The polyolefin can be ethylene vinyl acetate, ethylene methyl acrylate, polyethylene, polypropylene, ethylene-propylene rubber, ethylene-propylene-diene rubbers, poly(1-butene), polystyrene, poly(2-butene), poly(1-pentene), poly(2-pentene), poly(3-methyl-1-pentene), poly(4-methyl-1-pentene), 1,2 poly-1,3-butadiene, 1,4-poly-1,3-butadiene, polyisoprene, polychloroprene, poly(vinyl acetate), poly(vinylidene chloride), poly(vinylidene fluoride), poly(tetrafluoroethylene) or a mixture thereof.

The polyester can be polyethylene terephthalate (PET), polybutylene terephthalate (PBT), polyethylene naphthalate (PEN), copolymers of PET, copolymers of PBT and copolymers of PEN.

The monolithic structure in the double-dip and/or the single-dip method(s) can have channels having about 50 to about 900 cells per square inch.

The channels can be square, triangular, or sinusoidal in cross-section.

The channels can be straight, zig-zag, skewed, or herringbone in shape.

The channels can have walls that are perforated or louvered.

The ceramic or plastic monolithic structure in the double-dip and/or the single-dip method(s) can be made by extrusion.

The metal or plastic monolithic structure in the double-dip and/or the single-dip method(s) can be made by layering corrugated metal foil or corrugated plastic sheets.

The solvent in the double-dip and/or the single-dip method(s) can be selected from the group consisting of water, methanol, ethanol, toluene, isopropanol, 2-methoxyethyl ether, and mixtures thereof.

Alumina Support

According to an embodiment, an alumina support comprising a sorbent coating is disclosed. As discussed hereinabove, the sorbent adsorbs carbon dioxide and the sorbent is selected from the group consisting of amines; monoethanolamine; diethanolamine; polyethylenimine (PEI); aminopropyltrimethoxysilane; polyethyleneimine-trimethoxysilane; amide or amine containing polymers including nylon, polyurethane, polyvinylamine, or melamine; and combinations thereof. In some preferred embodiments, the sorbent is polyethylenimine (PEI).

The alumina support has a surface area of about 150 $m^2/g$ to 250 $m^2/g$ and a pore volume of about 0.7 cc/g to 1.5 cc/g. In some preferred embodiments, the alumina support has a surface area of about 170 $m^2/g$ to 180 $m^2/g$ and a pore volume of about 0.9 cc/g to 1.2 cc/g. In even more preferred embodiments, the alumina support has a surface area of about 175 $m^2/g$ and a pore volume of about 1.1 cc/g.

Adsorption & Desorption Cycles

Figure 2:
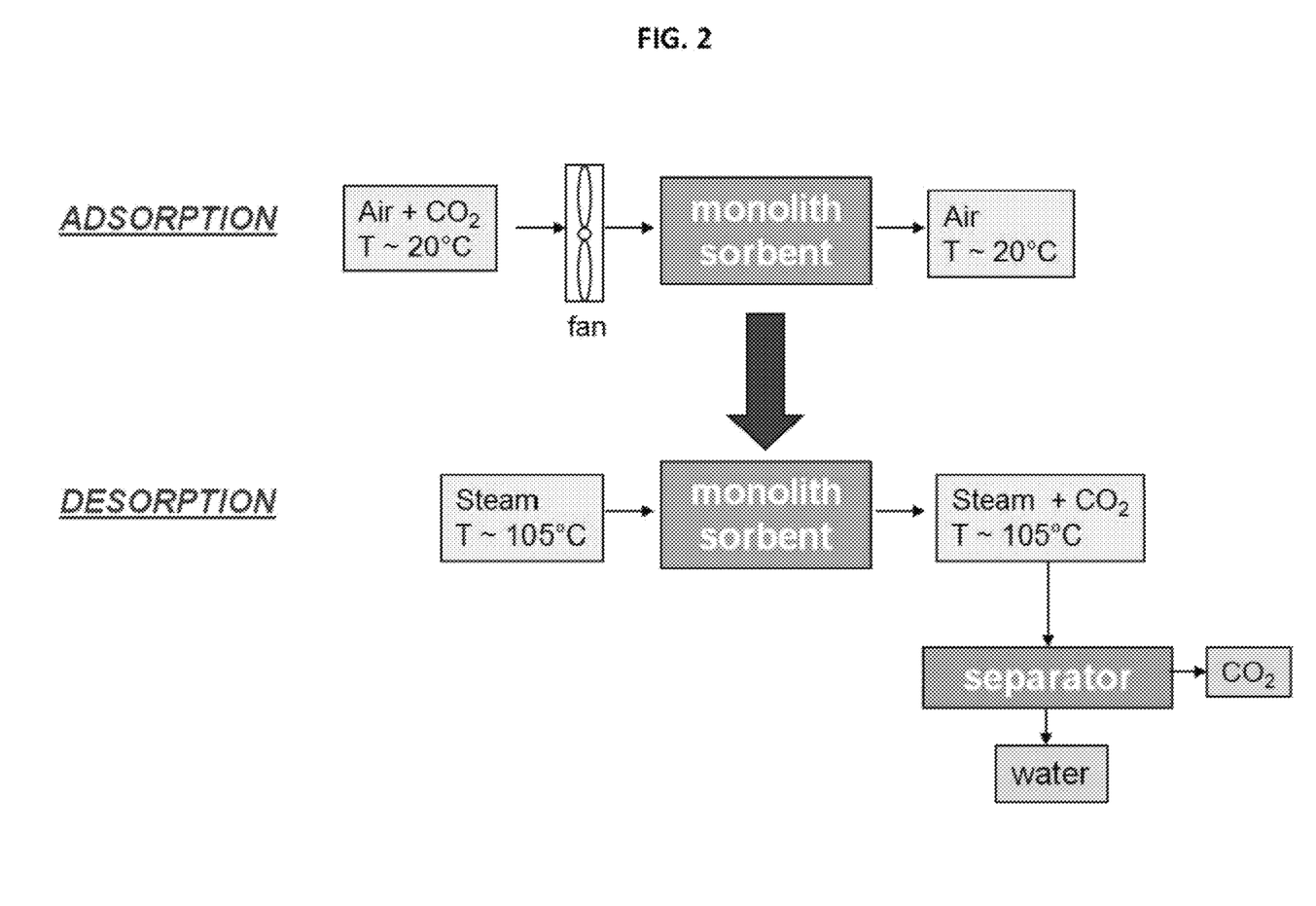
FIG. 2 schematically shows a flowchart of adsorption and desorption cycles.

FIG. 2 schematically shows a flowchart of adsorption and desorption cycles. As shown in FIG. 2, during the adsorption cycle, a monolith sorbent adsorbs carbon dioxide at relatively low temperature, for example about 20° C., when air and carbon dioxide are passed through the monolith sorbent using a fan. Then, as shown in FIG. 2, during the desorption cycle, the monolith sorbent is placed into a regeneration unit wherein the monolith sorbent is subjected to a gas flow at elevated temperature to regenerate the sorbent and concentrate the amount of $CO_2$ in the stream. This gas flow could be in the form of steam or could be an inert gas such as nitrogen at a temperature of about 90° C. to about 110° C. Steam containing carbon dioxide is recovered from the monolith sorbent and then concentrated carbon dioxide can be recovered using a separator. It is possible to obtain about >95% carbon dioxide with this method.

It will now be apparent to those skilled in the art that this specification describes new, useful, and nonobvious methods of applying a sorbent coating on a substrate, a support, and/or a substrate coated with a support are described in this application. It will also be apparent to those skilled in the art that numerous modifications, variations, substitutes, and equivalents exist for various aspects of the invention that have been described in the detailed description above. Accordingly, it is expressly intended that all such modifications, variations, substitutions, and equivalents that fall within the spirit and scope of the invention, as defined by the appended claims, be embraced thereby.

EXAMPLES

Example 1

A slurry was made by mixing 45.22 g of alumina with 4.52 g of aluminum oxide hydroxide and 169.48 g of water. This slurry was coated onto honeycomb made of cordierite such that 1.15 g/in3 of alumina coating was applied. This alumina coated honeycomb was then impregnated with polyethylenimine (PEI) by immersing in an aqueous solution having 20% PEI. The so prepared core was tested for $CO_2$ adsorption capacity (described hereinbelow in Example 3—Adsorption Test) and found to adsorb 4.20 mmol $CO_2$/g of PEI.

Example 2

Adsorption Test Procedure

Flow 400 ppm $CO_2$ in air with 1% water through adsorbent coated honeycomb at 35° C. at a velocity of 2.5 msec until sample is saturated with $CO_2$. Desorb the $CO_2$ by flowing nitrogen with 1% water at 110° C. through the core. Adsorb $CO_2$ again at the same conditions as previous adsorption.
More Detailed CO2 Adsorption Test Procedure Prior to conducting the adsorption measurement, each sample undergoes a treatment of exposing the sample to a flow of 400 ppm $CO_2$ in air with 1% water at a velocity of 2.5 msec and at a temperature of 35° C. until the sample is saturated with $CO_2$. The sample is sorbent impregnated onto a support coated onto a substrate: for example PEI on alumina coated onto a ceramic honeycomb. The sample is then purged of $CO_2$ by flowing nitrogen with 1% water through the sample at 2.5 msec and a temperature of 110° C. until no more $CO_2$ is released. Then the adsorption measurement is conducted by flowing 400 ppm $CO_2$ in air with 1% water at a velocity of 2.5 msec and at a temperature of 35° C. through the sample until it is saturated with $CO_2$.

Example 3

Samples were made by the double-dip coating method. The first coat was made by applying a water based slurry having the composition listed below to ceramic honeycomb. Each sample was made using a different alumina (alumina A thru K) having different properties of surface area and pore structure.
First Coating Composition:

| | | |
|---|---|---|
| a. Alumina | 92% | |
| b. Binder (alumina sol) | 6% | |
| c. Dispersant | 2% | |

This was calcined to adhere the coating. The weight of this first coat is approximately 1.2 g/in3 of honeycomb.

Polyethylenimine was applied as a second dip from an aqueous solution resulting in an organic fraction of the total coating of 26% to 39% (see table). (organic fraction is (PEI weight divided by (alumina plus binder weight) the dispersant is not counted because it is removed by the calcining step).

Figure 3:
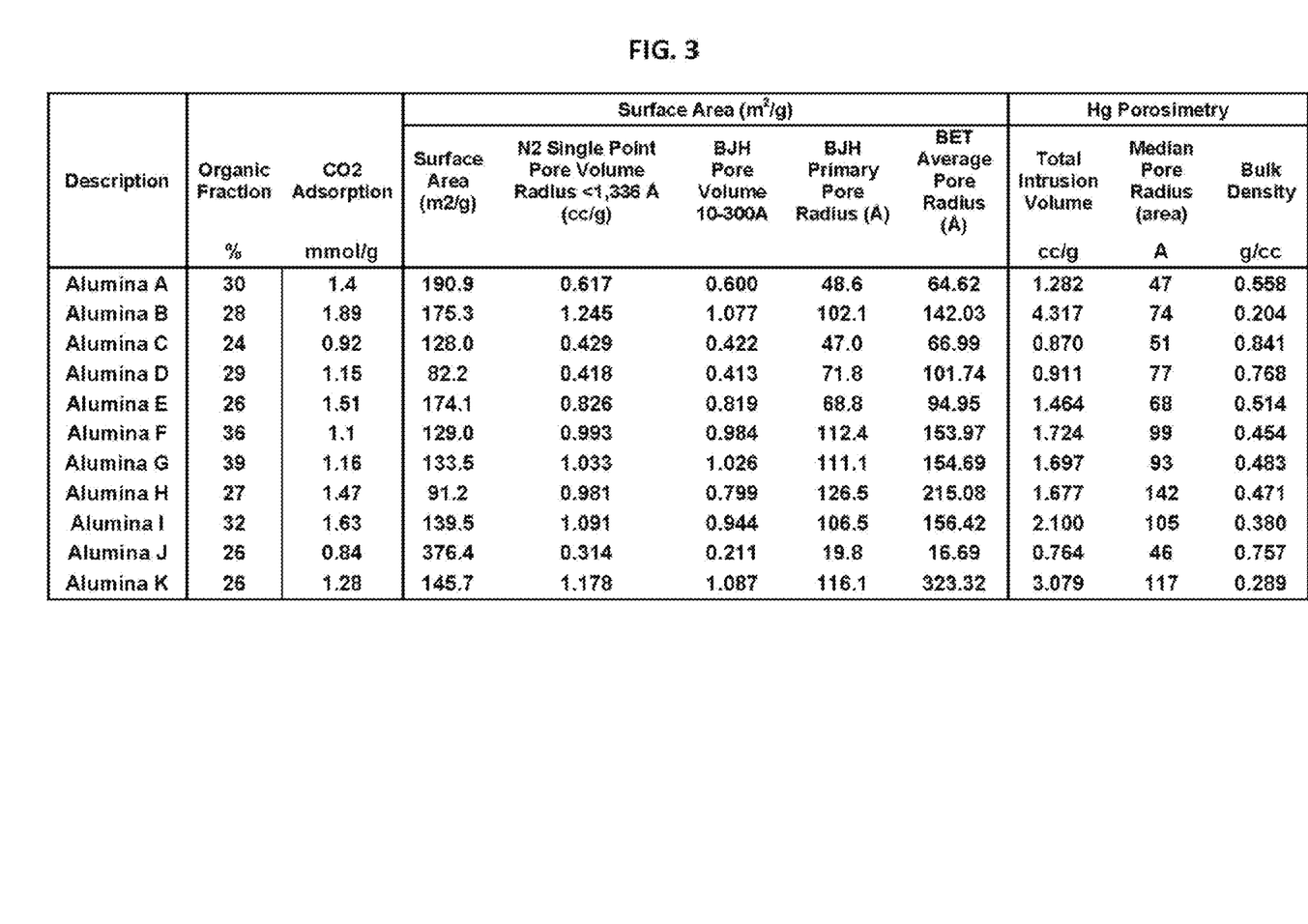
FIG. 3. shows a table summarizing the properties of aluminas A-K that were used as the support for testing a sorbent such as PEI including the performance of aluminas A-K in terms of $CO_2$ captured.
Figure 8:
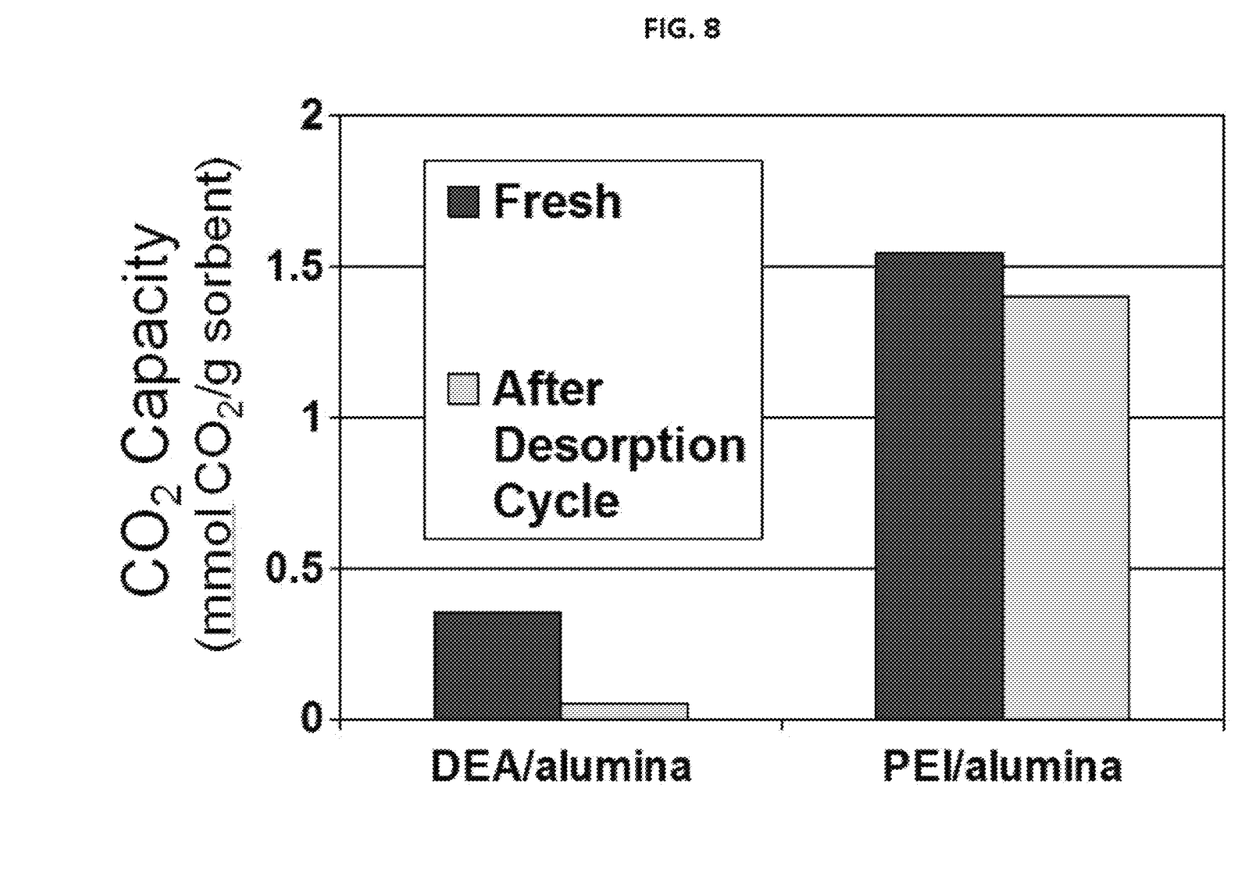
FIG. 8 is a graphical representation of a comparison of $CO_2$ capture between diethanolamine (DEA) and PEI.

FIG. 3 shows a table summarizing the properties of aluminas A-K that were used as the support for testing a sorbent such as PEI including the performance of aluminas A-K in terms of $CO_2$ captured per gram of coating (the coating is the combination of PEI, alumina, and binder which is applied to the ceramic honeycomb). As can be seen in FIG. 8, Alumina B has the highest $CO_2$ capture and has the preferred combination of surface area and pore volume. This alumina B also has an extremely high mercury total intrusion.

Figure 4A:
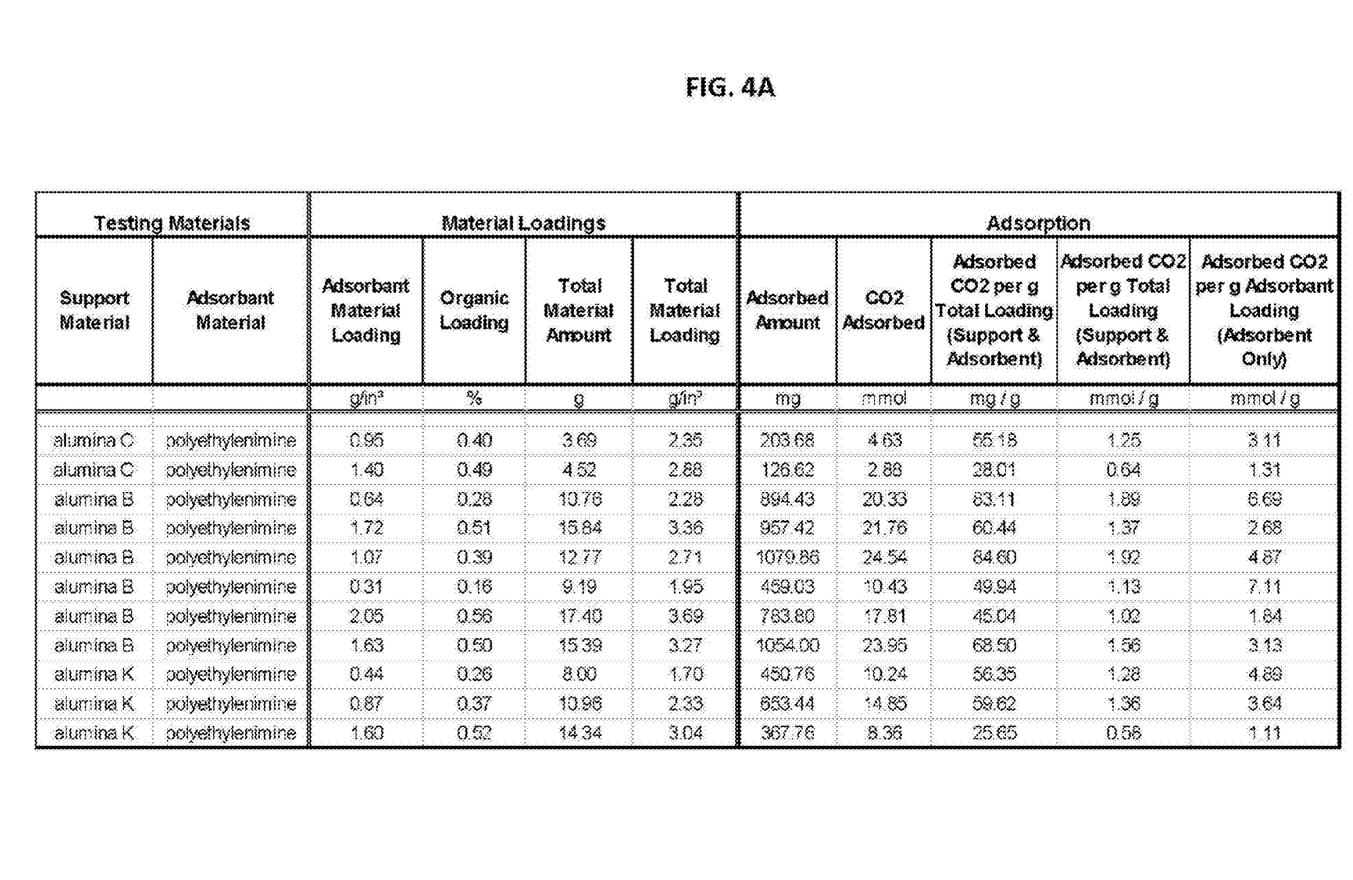
FIGS. 4A and 4B show tables that summarize the adsorption and desorption results of aluminas A-K.
Figure 4B:
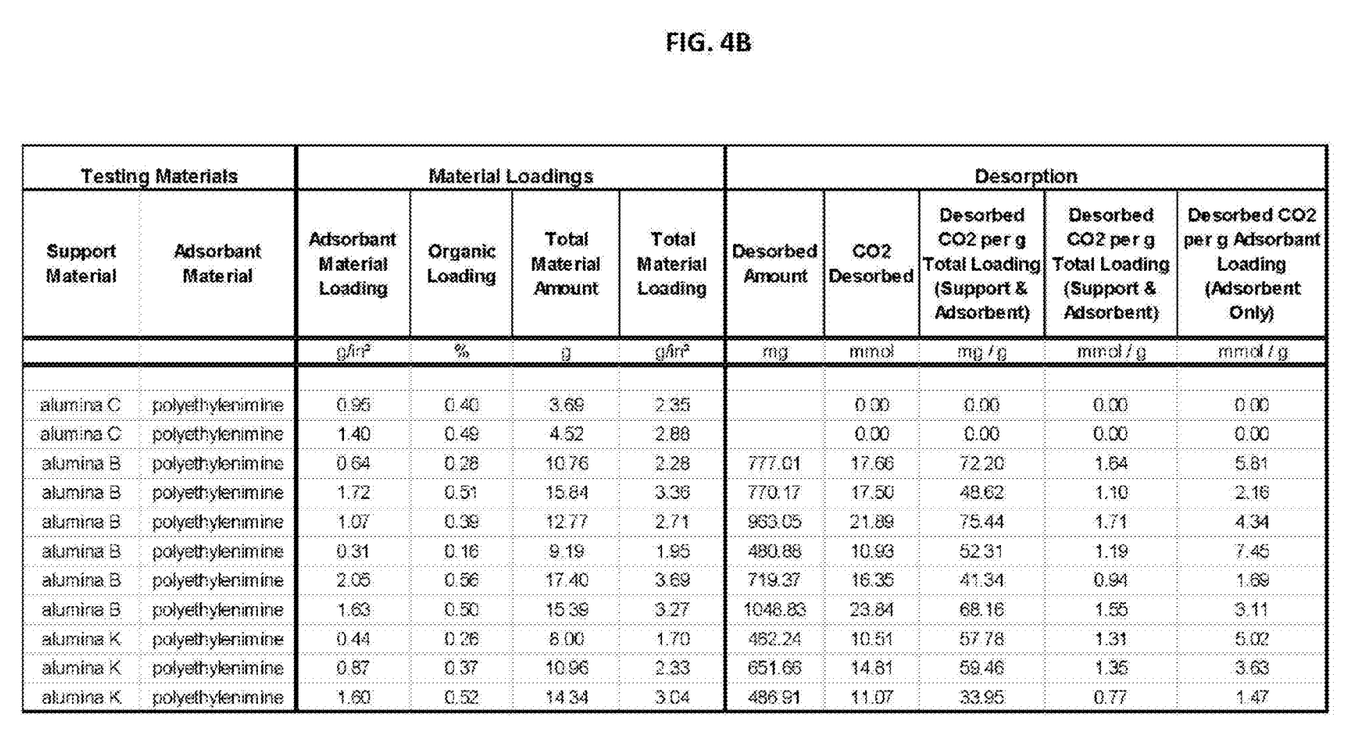

FIGS. 4A and 4B show tables that summarize the adsorption and desorption results of aluminas A-K. The data in these two tables shows that adsorption increases with increasing pore volume. The data also shows that adsorption increases with increasing intrusion volume. The data further shows that adsorption decreases with increasing bulk density.

Example 4

These samples are prepared in the same method as example 3 (double-dip with same bill-of-materials) with the exception that the amount of PEI applied was varied between the samples. The organic fraction of each of the samples is given in the table.

Figure 5:
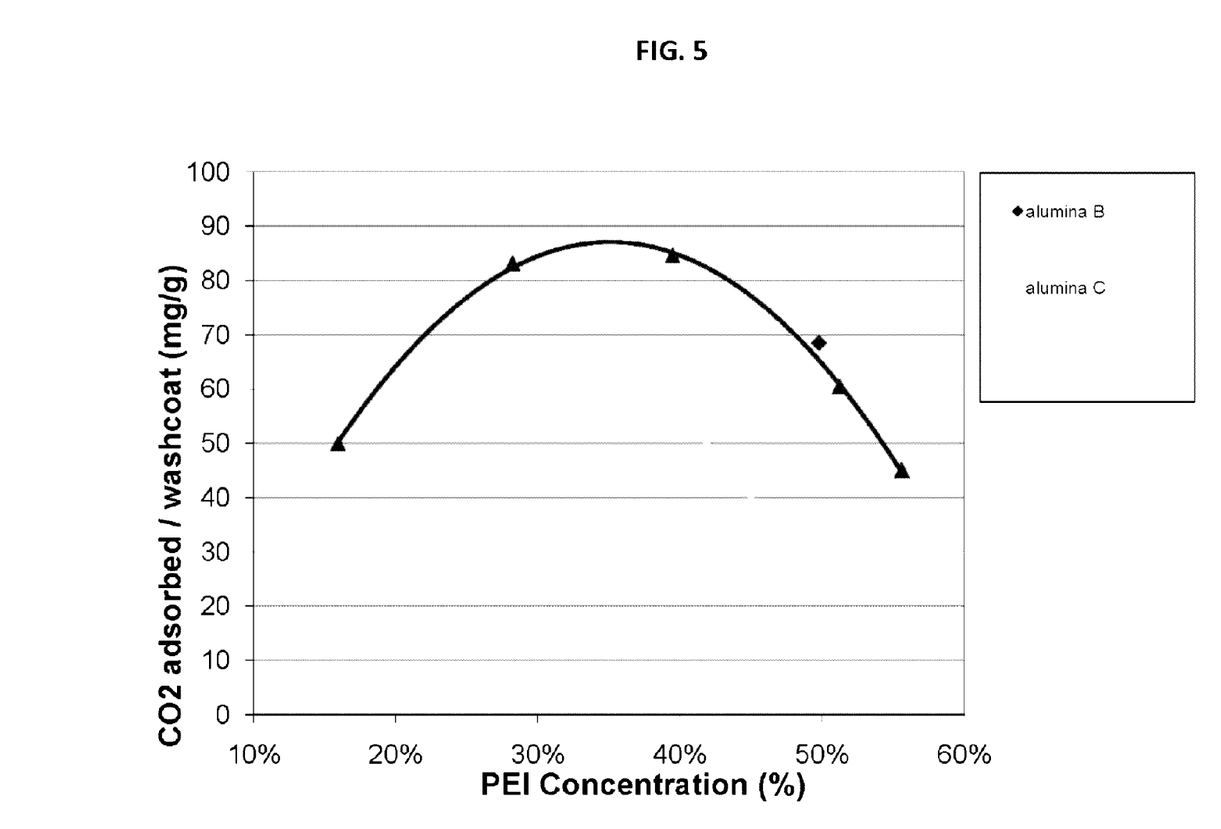
FIG. 5 is a graphical representation of the amount of $CO_2$ adsorbed normalized to the total weight of coating as a function of PEI content.

FIG. 5 is a graphical representation of the amount of $CO_2$ adsorbed normalized to the total weight of coating (column labeled "Adsorbed CO2 per g Total Loading (Support & Adsorbent)") as a function of PEI content (column labeled "Organic Loading") shown in the table labeled FIG. 4A. The column labeled "Organic Loading" in FIGS. 4A and 4B (i.e., PEI concentration) is the weight of PEI divided by the weight of (PEI+alumina).

This coating weight includes both the alumina and polyethylenimine (PEI) weight. As can be seen in FIG. 5, increasing the amount of PEI increases the amount of $CO_2$ captured by the PEI coated onto alumina B up to a point in the range of about 30-40% PEI concentration at which point the amount of $CO_2$ captured decreases with higher PEI content. It is believed that that the decrease in $CO_2$ capture is a result of filling the pore structure of the alumina support. Also plotted in FIG. 5 is the performance of alumina C which shows that alumina C is not as effective at capturing $CO_2$ as is alumina B. It is believed that pore structure of the alumina influences the ability to apply PEI to the alumina and have efficient $CO_2$ capture. Alumina C does not have the optimum combination of surface area and pore volume when compared with alumina B.

Figure 6:
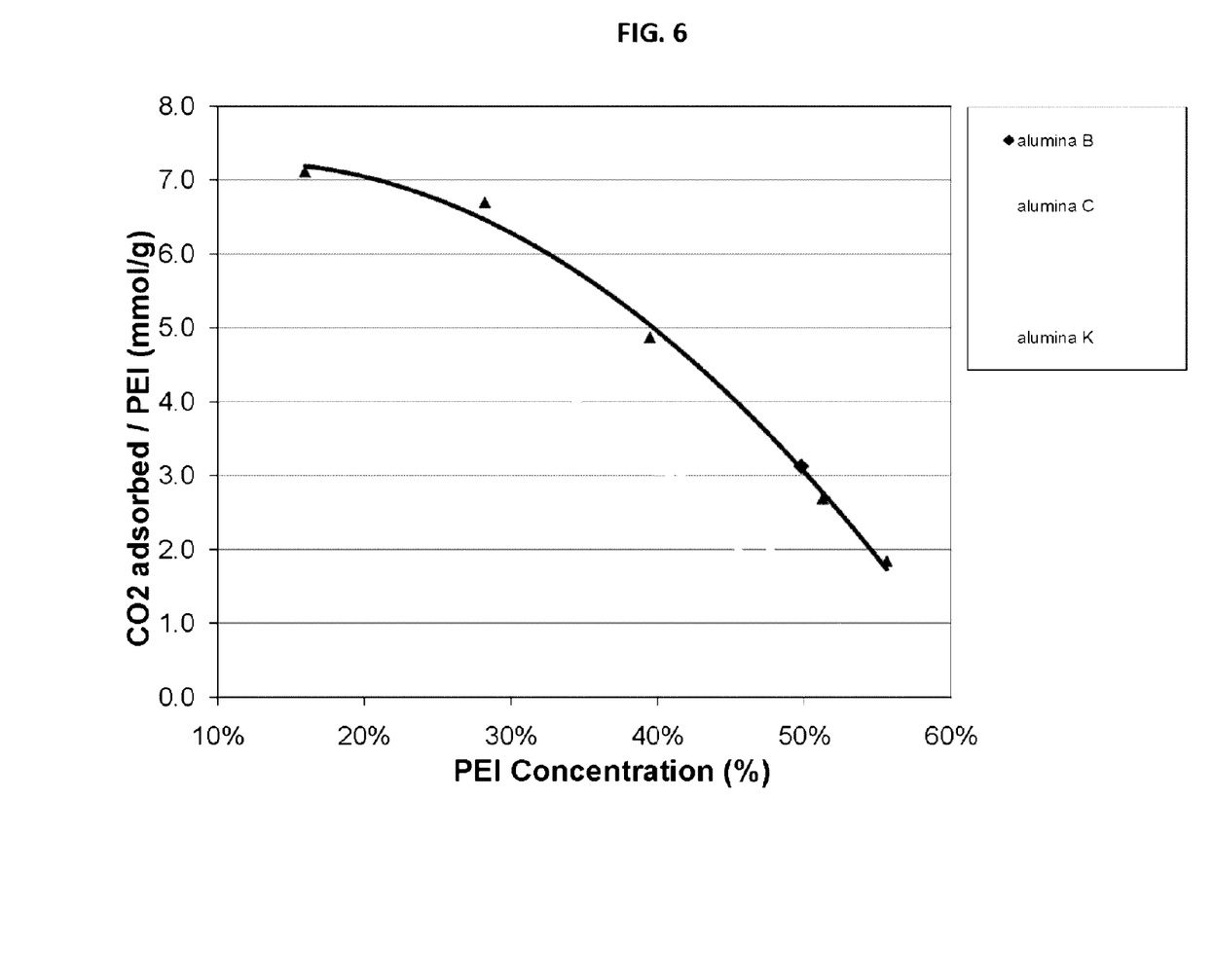
FIG. 6 is a graphical representation of the amount of $CO_2$ adsorbed normalized to the weight of PEI as a function of PEI content.

FIG. 6 is a graphical representation of the amount of $CO_2$ adsorbed normalized to the weight of PEI (column labeled Adsorbed CO2 per Adsorbent Loading (Adsorbent Only)") as a function of PEI content (column labeled "Organic Loading") shown in the table labeled FIG. 4A. This plot essentially provides a measure of the efficiency of utilization of the PEI. It can be seen that the more PEI is added to the alumina coating the less efficient the PEI is at adsorbing $CO_2$. Also plotted are aluminas B, C, and K showing that the ability capture $CO_2$ by the PEI does depend on the properties of the alumina. As shown in FIG. 6, alumina B is the most effective out of aluminas B, C, and K.

Figure 7:
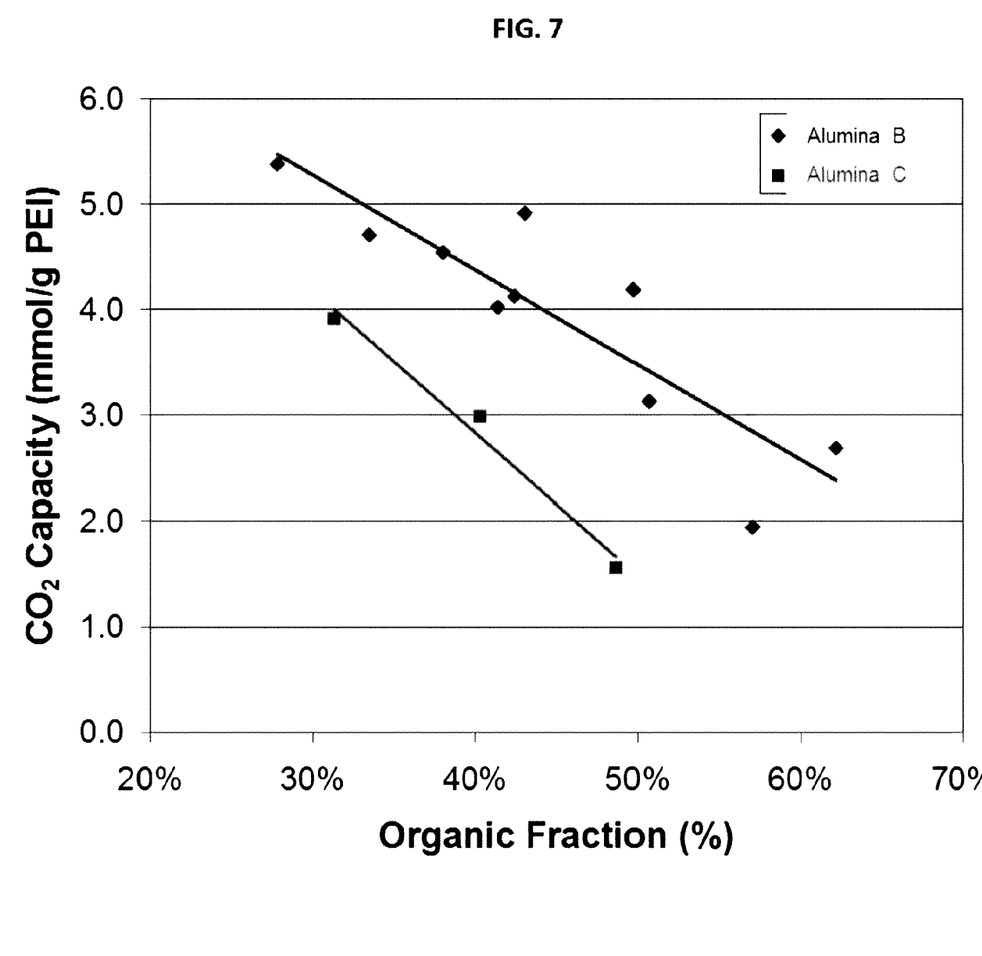
FIG. 7 is a graphical representation of the amount of $CO_2$ adsorbed normalized to the weight of PEI is shown for aluminas B and C.

FIG. 7 is similar to FIG. 6 discussed hereinabove with data measured and depicted in the same manner. The amount of $CO_2$ adsorbed normalized to the weight of PEI is shown for aluminas B and C having different surface areas and pore volumes demonstrating that alumina B with the higher surface area and pore volume has the most $CO_2$ capture. As a reminder, FIG. 3 shows that alumina B has a surface area of 175.3 $m^2/g$ and a pore volume of 1.077 cc/g whereas alumina C has a surface area of 128 $m^2/g$ and a pore volume of 0.422 cc/g.

Example 5

FIG. 8 is a graphical representation showing a comparison between diethanolamine (DEA) that is sometimes used for capturing $CO_2$ from power plant flue gas and PEI (both were impregnated on alumina) after exposing to nitrogen with 1% water through the sample at 2.5 msec and a temperature of 110° C. The $CO_2$ capture performance changes more than the PEI sample after this thermal treatment. $CO_2$ performance measurement was completed in the same manner as described hereinabove.

Example 6

Figure 9:
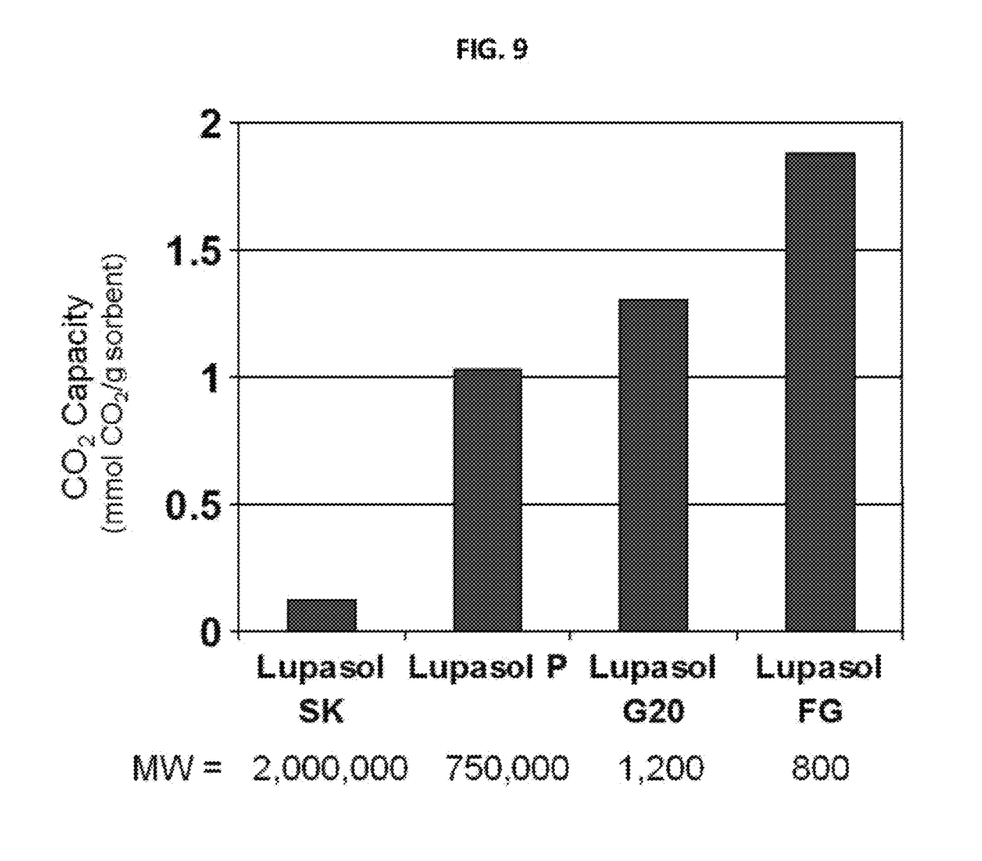
FIG. 9 is a graphical representation showing how molecular weight of the PEI affects $CO_2$ capture.

FIG. 9 is a graphical representation showing how molecular weight of the PEI affects performance in that the lowest molecular weight PEI (MW=800) had the highest $CO_2$ capacity. "Lupasol" is referred to in FIG. 9. It should be noted that Lupasol® is a registered trademark for polyethylenimines (PEI) which are multi-functional non-toxic cationic polymers sold by BASF. Lupasol® SK, Lupasol® P, Lupasol® G20, and Lupasol® FG are PEIs with different properties sold by BASF. Lupasol® SK has a molecular weight of 2,000,000, Lupasol® P has a molecular weight of 750,000, Lupasol® G20 has a molecular weight of 1,200, and Lupasol® FG has a molecular weight of 800.

Example 7

A sample was prepared by the method of Example 3 provided hereinabove having a total coating loading of 2.1 $g/in^3$ with 29% of the coating as PEI. This sample was evaluated for $CO_2$ adsorption capacity by flowing gas containing 4000 ppm of $CO_2$, 12% oxygen, 1% water, and balance nitrogen at a flow of 2.5 msec until saturated with $CO_2$. The sample was found to adsorb 3.88 mmol of $CO_2$ per gram of PEI.

The present invention has been described by way of the foregoing exemplary embodiments to which it is not limited. Variations and modifications will occur to those skilled in the art that do not depart from the scope of the invention as recited in the claims appended thereto.

What is claimed is:

1. A method of applying a sorbent coating on a substrate, the method comprising:
   (i) preparing the substrate by pre-treating the substrate with a slurry, wherein the slurry comprises:
      a. solvent,
      b. a binder, and
      c. a support; and
   (ii) subsequently treating the substrate with a sorbent;
   wherein the substrate is (a) a monolithic or honeycomb structure made of ceramic, metal, or plastic; (b) a polyurethane foam, a polypropylene foam, a polyester foam, a metal foam, or a ceramic foam; or (c) woven or non-woven plastic or cellulosic fibers,
   wherein the support comprises alumina, silica, silica-alumina, titania, zirconia, carbon, zeolite, metal-organic framework (MOF), or combinations thereof, the support having a surface area of 150 $m^2/g$ to 250 $m^2/g$ and a pore volume of 0.7 cc/g to 1.5 cc/g,
   wherein the sorbent adsorbs carbon dioxide and the sorbent is polyethylenimine (PEI);
   wherein the PEI is present at a concentration of 25 wt % to 45 wt % calculated as weight of PEI divided by weight of PEI and support; and
   wherein the surface area and pore volume of the support together provide the sorbent with a carbon dioxide adsorption capacity that is greater than 1.5 mmol $CO_2$/g coating.

2. The method of claim 1, wherein the ceramic substrate is selected from the group consisting of cordierite, alumina, cordierite-a alumina, silicon nitride, zircon mullite, spodumene, alumina-silica magnesia, zircon silicate, sillimanite, magnesium silicates, zircon, petalite, aluminosilicates, and combinations thereof.

3. The method of claim 2, wherein the ceramic substrate is cordierite, alumina, or a combination thereof.

4. The method of claim 1, wherein the metal substrate is aluminum, titanium, stainless steel, a Fe—Cr alloy, or a Cr—Al—Fe alloy in the form of a sheet, mesh, foil, flakes, powder, wire, rod, or combinations thereof.

5. The method of claim 4, wherein the metal substrate is aluminum, stainless steel, Cr—Al—Fe alloy, or combinations thereof in the form of a sheet, mesh, or foil.

6. The method of claim 1, wherein the plastic substrate is a polymer and/or copolymer of polyolefin(s), polyester(s), polyurethane(s), polycarbonate(s), polyetheretherketone(s), polyphenylene oxide(s), polyether sulfone(s), melamine(s), polyamide(s), polyacrylates, polystyrenes, polyacrylonitriles, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose, or combinations thereof.

7. The method of claim 6, wherein the plastic substrate is a polymer and/or copolymer of polyolefin, polyester, polyurethane, melamine, polypropylene, or polyamide.

8. The method of claim 1, wherein the monolithic structure has channels having about 50 to about 900 cells per square inch.

9. The method of claim 8, wherein the channels are square, triangular, or sinusoidal in cross-section.

10. The method of claim 8, wherein the channels are straight, zig-zag, skewed, or herringbone in shape.

11. The method of claim 8, wherein the channels have walls that are perforated or louvered.

12. The method of claim 1, wherein the ceramic or plastic monolithic structure is made by extrusion.

13. The method of claim 1, wherein the metal or plastic monolithic structure is made by layering corrugated metal foil or corrugated plastic sheets.

14. The method of claim 1, wherein step (i) further comprises:
   a. coating the substrate with the slurry;
   b. removing excess solvent from the coated substrate; and
   c. calcining the binder and the support onto the substrate.

15. The method of claim 14, wherein the calcining occurs at a temperature range of 200° C. to 550° C.

16. The method of claim 15, wherein the calcining occurs at a temperature of 425° to 475° C.

17. The method of claim 16, wherein the calcining occurs at a temperature of 450° C.

18. The method of claim 1, wherein the binder in step (i) is alumina sol, aluminum oxide hydroxide, silica sol, titania sol, zirconium acetate, silicone, or combinations thereof.

19. The method of claim 18, wherein the alumina sol is milled to have a D50 particle size ranging from 1 µm to 10 µm.

20. The method of claim 19, wherein the alumina sol is milled to have a D50 particle size ranging from 3 µm to 6 µm.

21. The method of claim 1 further comprising:
(iii) after step (ii), drying the treated substrate to remove excess amounts of the sorbent and to remove excess solvent to obtain a sorbent coated substrate.

22. The method of claim 21, wherein the drying occurs at a temperature range of 30° C. to 70° C.

23. The method of claim 22, wherein the drying occurs at a temperature range of 40° C. to 60° C.

24. The method of claim 23, wherein the drying occurs at a temperature 50° C.

25. The method of claim 1, wherein the solvent is selected from the group consisting of water, methanol, ethanol, toluene, isopropanol, 2-methoxyethyl ether, and mixtures thereof.

26. The method of claim 1, wherein the sorbent adsorbs carbon dioxide from air, from off-gases, intentionally produced carbon dioxide, or from their mixtures.

27. The method of claim 26, wherein the adsorbed carbon dioxide is stored and/or used in enhanced oil recovery, in carbonation of beverages, for food processing/cooling/freezing, as a reactant in the production of chemicals, as a feedstock for algae, or as a fire extinguishing medium.

28. The method of claim 1, wherein the sorbent purifies gases or separates gases.

29. The method of claim 1, wherein the sorbent adsorbs carbon dioxide to purify natural gas, ambient air, flue gas, or other impure gas mixtures containing carbon dioxide.

30. The method of claim 1, wherein the slurry further comprises a dispersant.

31. The method of claim 1, wherein the binder is added in an amount of up to about 10 wt % based on a total weight of the support.

32. The method of claim 1, wherein the binder is added in an amount of about 6 to about 25 wt % based on a total weight of the support.

33. The method of claim 1, wherein the sorbent is added in an amount of about 25 to about 40 wt % based on the total weight of the support.

34. The method of claim 1, wherein the support has a surface area of about 170 $m^2$/g to 180 $m^2$/g and a pore volume of about 0.9 cc/g to 1.2 cc/g.

* * * * *